United States Patent [19]

Clarke et al.

[11] Patent Number: 5,137,050

[45] Date of Patent: Aug. 11, 1992

[54] PRESSURE RELIEF VALVE AND CRYOPUMP UTILIZING THE SAME

[75] Inventors: Hans T. Clarke, Hudson; Stephen J. Yamartino, Wayland; Thomas J. Dunn, Avon, all of Mass.

[73] Assignee: Helix Technology Corporation, Mansfield, Mass.

[21] Appl. No.: 800,759

[22] Filed: Dec. 2, 1991

Related U.S. Application Data

[63] Continuation of Ser. No. 334,921, Apr. 7, 1989, abandoned.

[51] Int. Cl.⁵ .................. F16K 15/06; F16K 25/00
[52] U.S. Cl. .................... 137/541; 137/542; 251/900
[58] Field of Search ........... 137/541, 542, 902; 417/901; 251/900

[56] References Cited

U.S. PATENT DOCUMENTS

| | | | |
|---|---|---|---|
| 1,170,412 | 2/1916 | Campbell | 137/541 X |
| 2,072,271 | 3/1937 | Meadows | 137/541 |
| 2,364,812 | 12/1944 | Pierson | 137/542 X |
| 2,599,622 | 6/1952 | Folmsbee | 137/53 |
| 2,621,885 | 12/1952 | Schmitt | 137/542 |
| 2,624,542 | 1/1953 | Ghormley | 251/27 |
| 2,650,793 | 9/1953 | Clark, Jr. et al. | 251/900 |
| 3,208,758 | 9/1965 | Carlson et al. | 277/171 |
| 4,303,251 | 12/1981 | Harra et al. | 277/236 |
| 4,655,046 | 4/1987 | Eacobacci et al. | 62/55.5 |
| 4,674,530 | 6/1987 | Bickford | 137/469 |
| 4,697,617 | 10/1987 | Bourke et al. | 137/541 X |

FOREIGN PATENT DOCUMENTS

| | | |
|---|---|---|
| 361646 | 10/1922 | Fed. Rep. of Germany . |
| 3636739 | 5/1987 | Fed. Rep. of Germany . |
| 2071092 | 9/1971 | France . |
| 558462 | 1/1975 | Switzerland ............ 137/541 |

OTHER PUBLICATIONS

"Del-Seal" Ultra-High Vacuum Flanges, technical data sheet of MDC Manufacturing, date unknown.

Primary Examiner—John Rivell
Attorney, Agent, or Firm—Hamilton, Brook, Smith & Reynolds

[57] ABSTRACT

A self-cleaning pressure relief valve has a spring-biased valve closure with an annular contact edge which makes contact with an o-ring to seal the valve. The annular contact edge is slightly larger in radius than the central radius of the o-ring so that changing pressure on the closure causes the contact edge to slide along the surface of the o-ring.

15 Claims, 2 Drawing Sheets

PRESSURE RELIEF VALVE AND CRYOPUMP UTILIZING THE SAME

This is a continuation of co-pending application Ser. No. 07/334,921 filed on Apr. 7, 1989 now abandoned.

BACKGROUND

Cryopumps currently available, whether cooled by open or closed cryogenic cycles, generally follow the same design concept. A low temperature array, usually operating in the range of 4 to 25 K, is the primary pumping surface. This surface is surrounded by a higher temperature radiation shield, usually operated in the temperature range of 70 to 130 K, which provides radiation shielding to the lower temperature array. The radiation shield generally comprises a housing which is closed except at a frontal array positioned between the primary pumping surface and the chamber to be evacuated. This higher temperature, first stage frontal array serves as a pumping site for higher boiling point gases such as water vapor.

In operation, high boiling point gases such as water vapor are condensed on the frontal array. Lower boiling point gases pass through that array and into the volume within the radiation shield and condense on the lower temperature array. A surface coated with an adsorbent such as charcoal or a molecular sieve operating at or below the temperature of the colder array may also be provided in this volume to remove the very low boiling point gases such as hydrogen. With the gases thus condensed and/or adsorbed onto the pumping surfaces, only a vacuum remains in the work chamber.

Once the high vacuum has been established, work pieces may be moved into and out of the work chamber through partially evacuated load locks. With each opening of the work chamber to the load lock, additional gases enter the work chamber. Those gases are then condensed onto the cryopanels to again evacuate the chamber and provide the necessary low pressures for processing. After continued processing, perhaps over several weeks, gases condensed or adsorbed on the cryopanels would have a volume at ambient temperature and pressure which substantially exceeds the volume of the cryopump chamber. If the cryopump shuts down, that large volume of captured gases is released into the cryopump chamber. To avoid dangerously high pressures in the cryopump with the release of the captured gases, a pressure relief valve is provided. Typically, the pressure relief valve is a springloaded valve which opens when the pressure in the cryopump chamber exceeds about 3 pounds per square inch gauge. Because the process gases may be toxic, the pressure relief valve is often enclosed within a housing which directs the gases through an exhaust conduit.

After several days or weeks of use, the gases which have condensed onto the cryopanels and, in particular, the gases which are adsorbed begin to saturate the system. A regeneration procedure must then be followed to warm the cryopump and thus release the gases and to remove the gases from the system. As the gases are released, the pressure in the cryopump increases and the gases are exhausted through the pressure relief valve.

A typical pressure relief valve includes a closure which, when the valve is closed, is held against an o-ring seal by a spring. With pressures which open the valve, the closure is pushed away from the o-ring seal and the exhausted gases flow past the seal. Along with the gas, debris such as particles of charcoal from the adsorber or other debris resulting from processing within the work chamber also pass the seal. That debris often collects on the o-ring seal and the closure cap. In order to effect a tight vacuum after regeneration, it is often necesssary to clean the relief valve after each regeneration procedure. If such care is not taken, leaks into the cryopump result at the relief valve and provide an undesired load on the cryopump.

Attempts at producing more reliable valves have been made in the past. One method involves the use of a solenoid actuator in conjunction with the spring holding the valve closure cap against the o-ring. This allows the use of a heavier spring with the closure, and thus a heavier pressure is generated at the contact point between the closure and the o-ring. In addition, a self-cleaning valve is disclosed in U.S. Pat. No. 4,719,938 to Pandorf. The valve uses wiper rings to clear debris from component surfaces and is thus more complex than conventional valves.

Filters have been used with success to extend the number of regeneration procedures before cleaning of the valve is required, see U.S. Pat. Nos. 4,655,046 and 4,697,617. However, even filters do not lead to sufficient relief valve reliability for fully automatic systems.

SUMMARY OF THE INVENTION

In accordance with the present invention, a pressure relief valve assembly is provided for relieving the high pressure buildup in a vessel such as a cryopump. The relief valve assembly comprises a relief valve housing, a valve closure and an o-ring for sealing between the valve housing and closure. When the valve is closed, the o-ring is pressed between the closure and the valve housing. A spring is positioned within the valve housing to pull the closure against the o-ring. The closure has an annular projection concentric with the o-ring, the cross section of which has an apex which contacts the o-ring. The projection is such that the seal between the closure and the o-ring is a single continuous annular contact edge. The contact edge has a radius larger than the central radius of the o-ring and smaller than the outside radius of the o-ring.

Also provided with the present invention is a cryopump using the self-cleaning pressure relief valve assembly. The cryopump may further include a filter associated with an exhaust port through which the relief valve assembly is in fluid communication with the cryopump chamber.

BRIEF DESCRIPTION OF THE DRAWINGS

The foregoing and other objects, features, and advantages of the invention will be apparant from the following more particular description of the preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
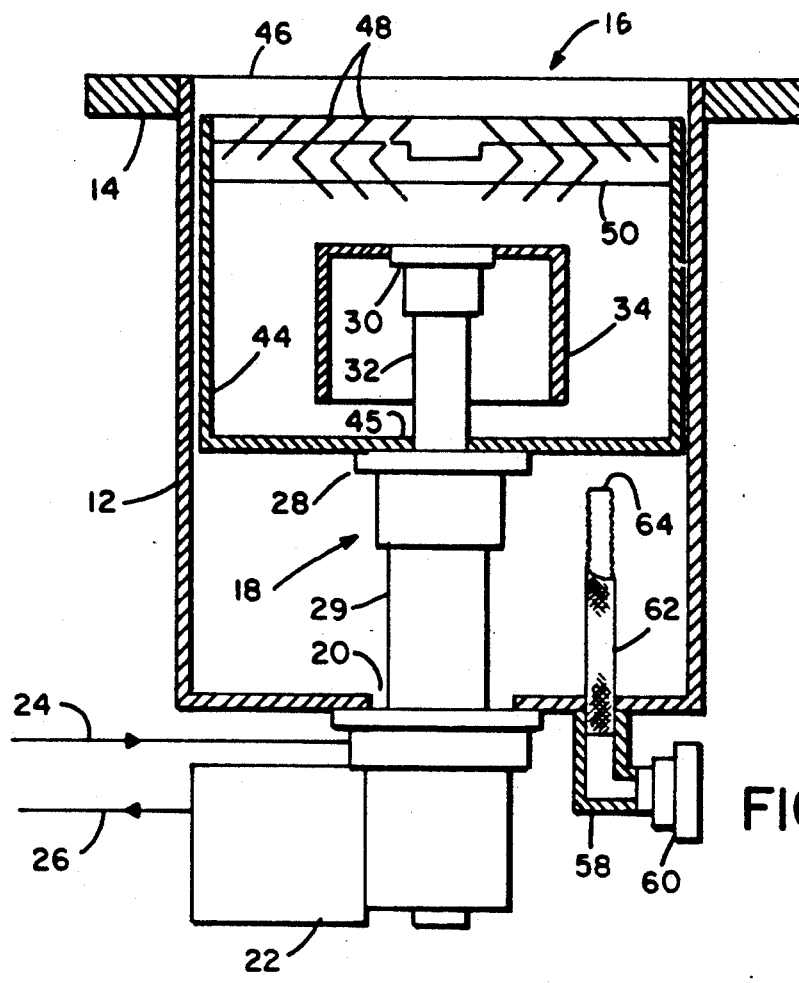
FIG. 1 is a cross sectional view of a cryopump having a self-cleaning pressure relief valve.

The cryopump of FIG. 1 comprises a main housing 12 which is mounted to a work chamber or a valve housing along a flange 14. A front opening 16 in the cryopump housing 12 communicates with a circular opening in the work chamber or valve housing. Alternatively, the cryopump arrays may protrude into the chamber and a vacuum seal be made at a rear flange. A two stage cold finger 18 of a refrigerator protrudes into the housing 12 through an opening 20. In this case, the refrigerator is a Gifford-MacMahon refrigerator but others may be used. A two stage displacer in the cold finger 18 is driven by a motor 22. With each cycle, helium gas introduced into the cold finger under pressure through line 24 is expanded and thus cooled and then exhausted through line 26. Such a refrigerator is disclosed in U.S. Pat. No. 3,218,815 to Chellis et al. A first stage heat sink, or heat station 28 is mounted at the cold end of the first stage 29 of the refrigerator. Similarly, a heat sink 30 is mounted to the cold end of the second stage 32.

The primary pumping surface is a cryopanel 34 mounted to the heat sink 30. In the case shown the cryopanel 34 is an inverted cup.

A cup shaped radiation shield 44 is mounted to the first stage, high temperature heat sink 28. The second stage of the cold finger extends through an opening 45 in that radiation shield. This radiation shield 44 surrounds the primary cryopanel array to the rear and sides to minimize heating of the primary cryopanel array by radiation. The temperature of this radiation shield ranges from about 100 K at the heat sink 28 to about 130 K adjacent to the opening 16.

A frontal cryopanel array 46 serves as both a radiation shield for the primary cryopanel array and as a cryopumping surface for higher boiling temperature gases such as water vapor. This panel comprises a circular array of concentric louvers and chevrons 48 joined by spoke-like plates 50. The configuration of this cryopanel 46 need not be confined to circular concentric components; but it should be so arranged as to act as a radiant heat shield and a higher temperature cryopumping panel while providing a path for lower boiling temperature gases to the primary cryopanel.

In a typical system, the cryopump is regenerated by turning off the refrigerator and allowing the system to warm. As the temperature of the system increases the gases are released, thus increasing the pressure in the system. As the pressure reaches about 3 PSIG the released gases are exhausted from the system through an exhaust conduit 58 and self-cleaning relief valve 60.

An additional exhaust conduit 62 extends upwardly from the inlet port of the conduit 58 at the base of the cryopump housing 12. The conduit 62 is formed of filter material such that liquid cryogens and water which collect at the bottom of the housing 12 are free to flow therethrough into the exhaust conduit 58. However, the filter material has sufficiently small openings to retain much of the debris which might contaminate the relief valve 60. Such an exhaust conduit is disclosed in U.S. Pat. No. 4,655,046 to Eacobacci et al.

Figure 2:
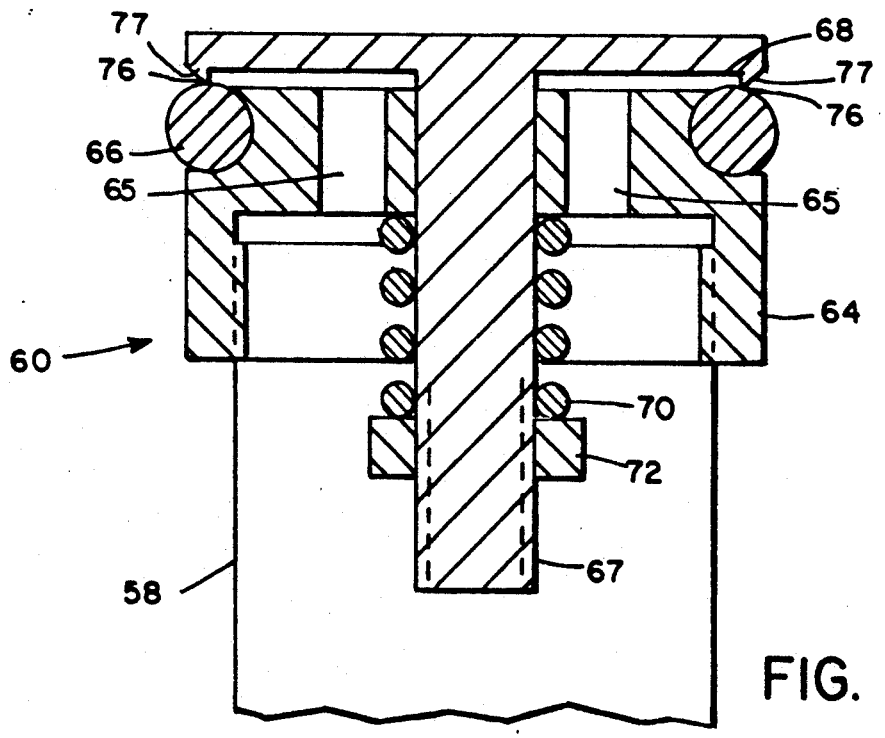
FIG. 2 is an enlarged cross sectional view of a self-cleaning pressure relief valve.

In accordance with the present invention, self-cleaning relief valve 60 reduces the contaminating effects of any debris which manages to get past additional exhaust conduit 62. FIG. 2 is a cross section of the relief valve 60 which is generally cylindrical in shape. The valve body has an annular groove in which is mounted o-ring 66. The valve body 64 also has a number of circumferential holes 65 about one larger hole passing through the middle. Extending through the center hole is shaft 67 of valve closure 68 which slides axially within the hole. The motion of closure 68 is restricted by the force of spring 70 which is compressed between the valve body 64 and a retaining nut 72 on the cylindrical shaft of the closure 68. The force of the spring acts to bring a contact edge 76 of the closure 68 against the o-ring 66 to seal the valve 60. The contact edge appears as the apex of the annular projection 77 which projects from the closure 68 in the cross section of FIG. 2.

Figure 3:
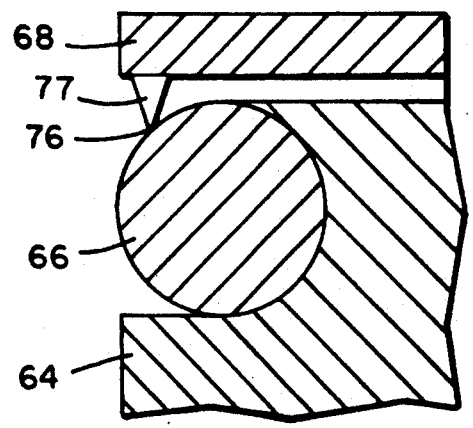
FIG. 3 is an enlarged cross sectional view of a contact edge of a valve closure and an o-ring.

The o-ring 66 is typically made of a hard synthetic rubber, which in the present embodiment is a flurocarbon copolymer sold under the trademark Viton, by duPont. Viton copolymers are fluorocarbon copolymers of vinylidene fluoride and hexafluoropropylene. FIG. 3 shows an isolated cross sectional view of o-ring 66 and the annular projection 77. As can be seen from the figure, the thin contact edge 76 is the only portion of the closure which makes contact with o-ring 66. The o-ring and the annular projection 77 are concentric with one another around the central axis of the valve 60, but the radius of the contact edge is slightly larger than the center radius of the o-ring. This results in the contact edge 76 making contact with the o-ring 66 along its outer surface relative to the center of the cross section of valve 60.

During a regeneration cycle, the relief valve 60 opens and gases are expelled through the valve 60. It is believed that the thin annular projection 77 of the valve closure 68 allows better gas flow around the closure surface and better ejection of any debris passing through the valve 60. The reduced sealing surface also allows less surface area upon which contaminants which hinder proper sealing of the valve may accumulate.

Figure 4:
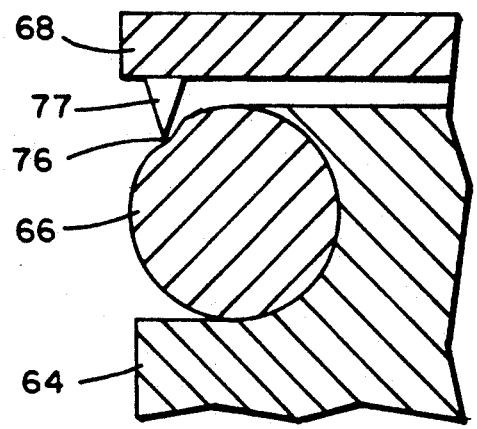
FIG. 4 is an enlarged cross sectional view of a contact edge of a valve closure and an o-ring under deflection due to pressure from the contact edge of the valve closure.

Further it is believed that as the valve closes, the contact edge 76 contacts o-ring 66 and slides along the surface of the o-ring under the compressive force of spring 70 as the o-ring is forced radially inward. This action serves to wipe the surface of the o-ring, clearing off any debris which may have accumulated in that region of the o-ring surface. As a vacuum is once again formed in cryopump housing 12, the contact edge 76 of the annular projection 77 is drawn into the o-ring 66 with an even greater force. This force causes the o-ring 66 to deflect under the concentrated load of the contact edge 76, as shown in FIG. 4. The deflection pulls the o-ring further inward while in contact with the edge 76, once again wiping off the o-ring surface.

The larger radius of the contact edge 76 relative to the center radius of the o-ring 66 has been found to dramatically improve the repeatability of closures with proper sealing. It is believed that the larger radius allows the contact edge to wipe along the surface of the o-ring. If the two radii were the same, the contact edge 76 would be positioned directly above the o-ring 66 and might depress directly into the o-ring surface rather than slide across it. In the present embodiment, the o-ring 66 is 0.014 inches in cross sectional diameter, and the contact edge 76 is positioned 0.050 inches off center toward the outside of the o-ring 66. The angle forming the contact edge is 30°, with the angle being centered around a line parallel to the shaft of the valve closure 68. Angles of 45° and 90° have also proven successful. Other successful configurations include an edge 0.020 inches off-center of a 0.070 inch o-ring, 0.010 off-center of a 0.140 inch o-ring and 0.040 inches off-center of a 0.140 inch o-ring. Seal material of 60 and 75 ducometer hardness has been successfully tested.

Figure 5:
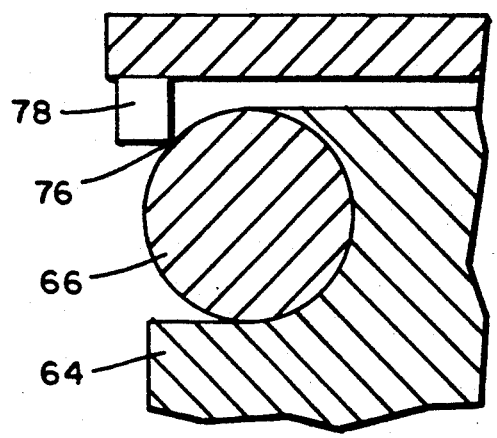
FIG. 5 is an enlarged cross sectional view of a contact edge of a valve closure formed by the corner of an annular projection from the valve closure which is substantially rectangular in cross section.

One alternative embodiment is shown in FIG. 5. This figure is similar to FIG. 3, but the annular projection 78 is formed in a different shape. For ease of manufacturing and durability, a squared-off annular projection 78 replaces the sharp angled annular projection 77 of FIG. 3. The angle of the contact edge 76 is no longer symmetrical about a line parallel to the closure shaft, but the annular projection 78 contacts the o-ring 66 far enough off center so that there is still only a single edge contact. Thus the improved gas flow and wiping features of the self-cleaning valve are retained.

While the invention has been particularly shown and described with reference to a preferred embodiment thereof, it will be understood by those skilled in the art that various changes in form and details may be made therein without departing from the spirit and scope of the invention as defined by the appended claims. For example, O-rings of different diameter may be used and the contact edge of the valve closure may be positioned different distances off center relative to the o-ring. Making the o-ring of different materials can change the effectiveness of the self-cleaning valve. Additionally, different shapes of annular projections may be used and different contact angles may be formed, without necessarily being symmetrical relative to the closure shaft. The function of retaining nut 72 of FIG. 2 may be accomplished with a recessed groove in which a retaining clip is trapped. The o-ring may be seated in the closure with the sealing edge projecting from the housing. The relief valve may be used with a filter means other than or in addition to the additional exhaust conduit 62 of FIG. 1. For example, a filter element and filter housing such as is disclosed in U.S. Pat. No. 6,679,617, to Bourke et al. can be used. The self-cleaning relief valve may also be used on equipment other than cryopumps.

We claim:

1. A pressure relief valve assembly comprising:
 a relief valve housing;
 a valve closure;
 an o-ring pressed between the closure and the valve housing, one of the closure and housing having an annular projection constrained to be concentric with the o-ring, the cross section of which has an apex in contact with the o-ring such that the seal between the closure and the o-ring is a single continuous annular contact edge, the contact edge having a radius larger than the central radius of the o-ring and smaller than the outside radius of the o-ring; and
 a spring positioned within the valve housing for pulling the closure toward the housing.

2. The pressure relief valve assembly of claim 1 wherein the annular projection of the closure has a cross section which is triangular in shape.

3. The pressure relief valve assembly of claim 1 wherein the o-ring is seated in the housing and the projection extends from the closure.

4. A cryopump having a pressure relief valve assembly, the vale assembly comprising:
 a relief valve housing;
 a valve closure;
 an o-ring pressed between the closure the valve housing, one of the closure and housing having an annular projection constrained to be concentric with the o-ring, the cross section of which has an apex in contact with the o-ring such that the seal between the closure and the o-ring is a single continuous annular contact edge, the contact edge having a radius larger than the central radius of the o-ring and smaller than the outside radius of the o-ring, and
 a spring positioned within the valve housing for pulling the closure toward the housing.

5. The cryopump of claim 4 of wherein the annular projection of the closure of the pressure relief valve assembly has a cross section which is triangular in shape.

6. The cryopump of claim 4 wherein the o-ring is seated in the housing and the projection extends from the closure.

7. The cryopump of claim 4 further comprising an exhaust port through which the relief valve assembly is in fluid communication and a filter associated with the port.

8. A method of relieving pressure in a cryopump comprising providing a pressure relief valve assembly having a relief valve housing, a valve closure and an o-ring pressed between the closure and the valve housing, one of the closure and the housing having an annular projection constrained to be concentric with the o-ring, the cross section of which has an apex in contact with the o-ring such that the seal between the closure and the o-ring is a single continuous annular contact edge, the contact edge having a radius larger than the central radius of the o-ring and smaller than the outside radius of the o-ring, the valve assembly also having a spring positioned within the valve housing for pulling the closure against the o-ring.

9. The method of claim 8 wherein the annular projection of the closure has a cross section which is triangular in shape.

10. The method of claim 8 wherein the o-ring is seated in the housing and the projection extends from the closure.

11. The method of claim 8 further comprising providing an exhaust port and a filter associated with the port through which the relief valve assembly is in fluid communication with a cryopump chamber.

12. The pressure relief valve assembly of claim 3 wherein the closure has a shaft which slides in a center hole in the housing, the housing having a plurality of fluid passages through the housing about the center hole.

13. The cryopump of claim 6 wherein the valve closure has a shaft which slides in a center hole in the housing, the housing having a plurality of fluid passages through the housing about the center hole.

14. The method of claim 10 wherein the valve closure provided with the pressure relief valve assembly has a shaft which slides in a center hole in the housing, the housing having a plurality of fluid passages through the housing about the center hole.

15. A pressure relief valve assembly comprising:
 a relief valve housing;
 an o-ring seated in the valve housing;

a valve closure having an annular projection constrained to be concentric with the o-ring, the cross-section of which is triangular in shape having an apex which makes contact with the o-ring such that the seal between the closure and the o-ring is a single continuous annular contact edge, the contact edge having a radius larger than the central radius of the o-ring and smaller than the outer radius of the o-ring, the valve closure also having a shaft which slides in a center hole in the housing, the housing having a plurality of fluid passages through the housing about the center hole;

a spring positioned within the valve housing for pulling the closure toward the housing.

* * * * *